2,848,491

PREPARATION OF CARBOXYLIC ACID CHLORIDES

Gordon F. MacKenzie and Elton K. Morris, Midland, Mich., assignors to The Dow Chemical Company, Midland, Mich., a corporation of Delaware No Drawing. Application October 7, 1954
Serial No. 461,034

18 Claims. (Cl. 260—544)

This invention pertains to the preparation of carboxylic acid chlorides by reaction of carboxylic acids with phosgene. It particularly concerns the preparation of carboxylic acid chlorides from monocarboxylic acids by reaction thereof with phosgene in the presence of certain anion exchange resins.

It is known that carboxylic acids can be converted to carboxylic acid chlorides by reaction with phosgene according to the general equation,

$$RCO_2H + COCl_2 \rightarrow RCOCl + CO_2 + HCl$$

wherein $RCO_2H$ represents an organic carboxylic acid and $RCOCl$ represents the corresponding carboxylic acid chloride.

It is also known that, in some instances, the phosgenation of carboxylic acids proceeds only sluggishly, or is incomplete, or is accompanied by undesired side reactions, such as the formation of carboxylic acid anhydrides.

In order to promote the phosgenation reaction of carboxylic acids, it has already been proposed to carry out the reaction in the presence of catalytic materials. For this purpose it has been suggested to dissolve into the carboxylic acid catalytic amounts of heterocyclic nitrogen compounds, tertiary amines or alkali metal salts of carboxylic acids.

In many instances, while these hithertofore proposed catalysts have advantageously increased the rate of reaction between phosgene and carboxylic acid, their presence has been found to be objectionable during the recovery of the carboxylic acid chloride from the reaction mixture. For example, during fractional distillation of such reaction mixtures containing dissolved catalysts, a part of the acid chloride is often lost by undergoing side reactions to form by-products such as carboxylic acid anhydride. Attempts to inactivate the dissolved catalysts or to separate them from the reaction mixture after completion of the phosgenation step have not generally been satisfactory. Furthermore, it is seldom possible to recover these already known catalysts for reuse in succeeding runs.

It is an object of this invention to provide an improved method for making carboxylic acid chlorides by reaction of phosgene with monocarboxylic acids.

A particular object is to provide such a method whereby the rate of reaction can be increased, the degree of conversion of the starting materials can be improved, and the carboxylic acid chloride product can be readily recovered from the resulting reaction mixture.

A further object is to provide new catalysts for such reaction, which catalysts can be readily separated from the resulting reaction mixtures when their catalytic mission has been accomplished, whereby the reaction mixtures can be liberated from deleterious effects of continued presence of the catalysts and the catalysts can be recovered in a form and condition satisfactory for reuse.

Further objects and advantages of the invention are evident in the following description.

The objects of this invention are attained in an improved method wherein monocarboxylic acids and phosgene are inter-reacted while the reactants are in contact with insoluble nitrogenous anion exchange resin solids as catalysts. The resulting carboxylic acid chloride-containing reaction mixtures can be readily separated from the solid insoluble catalysts, e. g., by filtration, and the latter recovered thereby in a form and condition suitable for reuse. The carboxylic acid chlorides can be readily recovered from the reaction mixtures in the usual manner, e. g., by fractional distillation. In some instances, the carboxylic acid chloride can be distilled from the reaction mixture without separation therefrom of the catalyst solid.

Nitrogenous anion exchange resins, suitable for use as catalysts in the process of the invention, are known in the art. One group of synthetic anion exchange resins is derived from cross-linked chloromethylated polymeric resins, such as nuclear chloromethylated styrene-divinylbenzene copolymers, by reacting the chloromethylated polymer resins with suitable amines such as trialkyl amines, alkylalkanol amines, alkylalkanediol amines, or polyalkylene polyamines. Typical such anion exchange resins, and methods for their preparation, are described in U. S. Patents 2,591,573, 2,591,574 and 2,614,099. Another type of synthetic anion exchange resin is made by condensation of a phenol, an aldehyde and a primary or secondary amine or polyamine.

These anion exchange resins are usually supplied in granular or bead form and can be used in the present process in the form as supplied, or the solid resins can be further ground or crushed to provide more finely divided solid material, if desired. In continuous embodiments of the process wherein the catalyst solid is retained in a reaction zone while reactants and reaction mixture are passed therethrough, coarse particles, granules or beads are usually preferred. In batch processes, finely divided resin solids are usually preferred for ease of suspension thereof in the liquid reaction mixture.

Suitable anion exchange resins are supplied commercially either in the hydroxide anion form or in the chloride anion form, and are preferably employed in one of these forms. In all probability, the hydroxide anion form of resin is converted to the chloride anion form under the conditions of the phosgenation reaction. Suitable anion exchange resins can be employed in other anion forms, such as the carbonate form, particularly such anion forms as are readily converted to chloride anion form under the conditions of the phosgenation reaction.

Nitrogenous anion exchange resin catalysts are advantageously employed in the making of monocarboxylic acid chlorides by phosgenation of monocarboxylic aliphatic, cycloaliphatic, saturated or unsaturated acids or aromatic acids. Specific examples of typical acid chlorides, and the corresponding carboxylic acid starting materials, are:

Acetyl chloride, from acetic acid;
Chloroacetyl chloride, from chloroacetic acid;
Dichloroacetyl chloride, from dichloroacetic acid;
Trichloroacetyl chloride, from trichloroacetic acid;
Valeryl chloride, from valeric acid;
Oleoyl chloride, from oleic acid;
α-Butylcyclohexylacetyl chloride from α-butylcyclohexylacetic acid; and
Benzoyl chloride from benzoic acid.

Mixtures of monocarboxylic acids can be converted by reaction thereof with phosgene to form mixtures of the corresponding acid chlorides.

The method of the present invention is carried out by admixing, at a reaction temperature, phosgene and a monocarboxylic acid in a liquid form in the presence of one of the aforementioned nitrogenous anion exchange resins as catalyst for the reaction. The operation can be conveniently carried out at atmospheric pressure by bubbling gaseous phosgene into a quantity of a monocarboxylic acid in a liquid form in which is suspended an anion exchange resin, and maintaining the reaction mixture at a reaction temperature between room temperature and the boiling point of the reaction mixture, usually between about 90° C. and the boiling point of the reaction mixture, but not above about 200° C. Provision should be made for thorough contacting of gaseous and liquid phases by means of gas spargers, stirrers, baffles and the like.

Monocarboxylic acids which are not liquid at the reaction temperature employed can be put into a liquid form by solution in a liquid solvent which is inert to the phosgenation reaction.

Where batch procedure is practiced, the catalyst is employed in an effective proportion usually between about 0.5 and about 10, preferably between about 1 and about 5, percent by weight of the reaction mixture, although larger proportions can be used. For such procedures, the catalyst is preferably finely divided and well dispersed through the reaction mixture. Flow of phosgene is continued until a desired proportion of monocarboxylic acid has been converted to the corresponding monocarboxylic acid chloride.

The batch procedure can be made continuous by feeding fresh monocarboxylic acid in a liquid form and catalyst to the reaction zone together with phosgene in proportions desired while continuously withdrawing an equivalent portion of liquid reaction mixture from the reaction zone.

The solid anion exchange resin catalyst can readily be separated from the liquid reaction mixture by usual means such as by filtering, by centrifuging or by decanting the liquid from the solid. The solid so separated is suitable for reuse in the process.

A preferred manner of continuous operation is one in which the solid, particulate, anion exchange resin catalyst is retained in a confined reaction zone and the reactants, i. e., a monocarboxylic acid in a liquid form and phosgene, in desired proportions, are caused to flow, either countercurrently or concurrently, through the reaction zone and over the solid catalyst. For this purpose, anion exchange resins in the form of coarse granules or beads are preferred and are retained in a reaction zone by means of screens, perforated plates or the like which are permeable to fluids. From such reaction zone, the liquid reaction mixture can be obtained substantially free from the catalyst material.

The monocarboxylic acid chloride can be recovered from the liquid reaction mixture in usual ways, e. g., by fractional distillation.

The following examples illustrate ways in which the invention has been practiced, but should not be construed as limiting its scope.

*Example 1*

Into a round-bottomed glass flask, equipped with gas sparger, reflux condenser and thermometer, were charged 7.06 gram-moles of chloroacetic acid and 1 percent of the weight thereof of finely ground, dry anion exchange resin. The latter was in the chloride form and was a quaternary ammonium resin made by amination of a chloromethylated insoluble styrene-divinylbenzene copolymer with dimethylethanolamine. The liquid charge was heated to, and held at, a temperature of about 150° C. while phosgene was bubbled in through the gas sparger. The gases evolved from the reaction mixture were conducted through the reflux condenser to a cold trap cooled with solid carbon dioxide and thence to a water scrubber. The reaction was discontinued when 8.06 gram-moles of phosgene had been passed into the reactor. From the cold trap was recovered 1.02 gram-moles of phosgene. Analysis of the water in the scrubber showed that 6.51 gram-moles of hydrogen chloride had collected therein.

The liquid reaction mixture was filtered from the solid catalyst and fractionally distilled, whereby 6.72 gram-moles of chloroacetyl chloride was recovered in the distillate, corresponding to about 95.5 percent of theoretical, calculated on chloroacetic acid charged and phosgene consumed in the reaction.

*Example 2*

By a procedure similar to that described in Example 1, 2.61 gram-moles of α-butylcyclohexylacetic acid was treated at 150–153° C. with 3.24 gram-moles of phosgene in the presence of 1 percent by weight of the acid charge of another portion of the finely divided anion exchange resin catalyst described in Example 1. There was recovered from the cold trap 0.68 gram-mole of unreacted phosgene, and 2.56 gram-moles of hydrochloric acid was found in the scrubber. By fractional distillation of the filtered liquid reaction product there was obtained 2.52 gram-moles of α-butylcyclohexylacetyl chloride, corresponding to about 96.5 percent of theoretical based on acid charged.

*Example 3*

By a procedure similar to that described in Example 1, 2.76 gram-moles of phosgene was bubbled into 1.92 gram-moles of oleic acid, containing 1 percent of its weight of a finely ground anion exchange resin of the kind previously described in Example 1, at temperatures between 150° and 155° C. From the cold trap there was recovered 0.71 gram-mole of phosgene. There was 1.95 gram-moles of acid found in the water scrubber. The reaction product contained 1.91 gram-moles of oleoyl chloride, corresponding to a yield of about 99.2 percent of theory, based on oleic acid charged.

*Example 4*

Into the apparatus described in Example 1 was charged 1.0 gram-mole of benzoic acid, together with enough pentachloroethane to make a liquid mixture at a temperature 150° C. and 3 percent by weight of the mixture of a finely divided anion exchange resin of the kind previously described in Example 1. Into the liquid charge at temperatures between 155° and 158° C., there was bubbled 1.52 gram-moles of phosgene, of which 0.52 gram-mole was recovered in the cold trap. The yield of benzoyl chloride in the reaction product was substantially quantitative based on the benzoic acid charged and the phosgene consumed by the reaction.

*Example 5*

Into an apparatus similar to that described in Example 1 was charged one gram-mole of dichloroacetic acid containing about 2.7 weight percent of a finely divided anion exchange resin of the kind previously described in Example 1. Over a period of two hours and at temperatures between 125° and 135° C., there was bubbled into the liquid charge 1.91 gram-moles of phosgene. Analysis of the resulting liquid reaction product showed that about 66 percent of the charged acid had been converted to dichloroacetyl chloride by the described procedure.

When the test procedure was repeated without an anion exchange resin catalyst, i. e., with a charge of dichloroacetic acid only, and phosgene in substantially the same amount, at the same rate, for the same time, and in the same temperature range as just described, the conversion of dichloroacetic acid to dichloroacetyl chloride was less than 0.5 percent of theory.

*Example 6*

In a series of tests, different anion exchange resins were evaluated as catalysts for the phosgenation of valeric acid. In an apparatus similar to that described in Example 1 was placed 300 grams (2.94 gram-moles) of valeric acid and 6 grams (2 percent by weight of the acid) of one of the anion exchange resins identified in the accompanying table as anion exchange resins A–D, each having been put into its chloride form, dried and ground to a fine powder. The anion exchange resins employed in the respective tests are as follows:

Resin A is the product of amination of a chloromethylated styrene-divinylbenzene copolymer with dimethylethanol amine and contains quaternary ammonium groups.

Resin B is a condensation product of a phenol, an aldehyde and an amine and contains secondary and tertiary amino groups.

Resin C is the product of amination of a chloromethylated styrene-divinylbenzene copolymer with trimethylamine and contains quaternary ammonium groups.

Resin D is the product of amination of a chloromethylated styrene-divinylbenzene copolymer with a polyethylene polyamine and contains secondary and tertiary amino groups.

The tests were carried out by bubbling an excess of phosgene through the reaction mixture at temperatures in the range of from 130° to 135° C. for three hours. The extent of conversion of valeric acid to valeryl chloride is shown in the table.

| Anion Exchange Resin | Conversion of Valeric Acid to Valeryl Chloride, Mole, Percent |
| --- | --- |
| A | 73 |
| B | 84 |
| C | 64 |
| D | 74 |

Example 7

An apparatus for testing continuous operation was assembled, comprising a vertical 2-inch-diameter by 44-inch long reactor column provided with external electric resistance heaters. A liquid acid feed was introduced to the top of the reactor column at a constant rate and through a preheater. Phosgene was sparged in near the bottom of the column at a constant rate through the usual gas train. The gas product from the top of the column was passed through a water-cooled condenser provided with a receiver from which the uncondensed vapors were passed through a trap cooled to a lower temperature by solid carbon dioxide and thence through a water scrubber. Liquid was taken from the bottom of the column through a riser which held the liquid level in the reactor column at about 32 inches above the phosgene inlet.

An anion exchange resin in bead form, of a kind described in Example 1, was converted to its chloride form and dried under vacuum. About 200 grams of the resulting resin beads was charged to the reactor column just described.

As feed material there was employed a chlorinated acetic acid mixture containing the following by weight:

64% trichloroacetic acid
29% dichloroacetic acid
5% monochloroacetic acid

This mixture was fed to the top of the column at an average rate of 1.93 pounds per hour while phosgene was fed to the bottom of the column at an average rate of 0.83 pound per hour. The reaction mixture was held at temperatures between 110° and 120° C. and the operations were continued for about 15 hours.

About 52 percent of the charged phosgene was consumed in the reaction, the unreacted portion being substantially recovered from the effluent vapor stream in the trap cooled with solid carbon dioxide.

About 20 percent of the charged mixed acids was converted to the corresponding mixed acyl chlorides, a portion of which was swept out with the effluent vapor stream and was condensed in the water cooled condenser, the remainder being found in the liquid product from the bottom of the reactor. No detectable amount of acid anhydrides was formed.

A higher conversion of the starting materials to acyl chlorides was obtainable by recycling the liquid reaction product from the bottom of the reactor and the recovered phosgene from the trap cooled with solid carbon dioxide.

By a process of fractional distillation at atmospheric pressure, from 85% to 95% of the acid chlorides in the reaction product was readily recovered.

In the absence of a catalyst, no reaction was observed.

In contrast to the results just described for catalysis with an anion exchange resin are the results obtained with a soluble catalyst. To a mixture of chlorinated acetic acid of the kind employed in the above experiment was added 1 percent of its weight of sodium trichloroacetate. This mixture was continuously phosgenated at 125° to 130° C. in the manner described above. About 34 percent of the phosgene and about 15 percent of the acid mixture were converted to the corresponding mixed acyl chlorides. Upon attempted fractional distillation, only about 44 percent of the resulting acyl chlorides could be recovered from the reaction product, the remainder being largely converted to acid anhydrides during the distillation. The sodium trichloroacetate catalyst could not readily be removed from the desired product and could not be recovered in a form and in a condition suitable for reuse.

Example 8

A tubular reactor was constructed of glass having an inside diameter of about 4 inches and a vertical height of about 30 inches and provided with electrical heaters. A bottom sparger was provided for feeding of gas. From the top of the reactor, vapors were conducted through a reflux water-cooled condenser, thence through a trap cooled with solid carbon dioxide and thence to a water scrubber and waste vent. To the reactor was charged 6254 grams of trichloroacetic acid and 120 grams of a dry anion exchange resin in the shape of beads and in the chloride ion form. The anion exchange resin was of the kind previously described in Example 1. With the temperature of the trichloroacetic acid charge at about 130° C., flow of phosgene to the bottom sparger was begun and continued for 11.5 hours, during which 4498 grams of phosgene was fed into the reactor and the temperature of the reaction mixture fell to about 90° C. Most of the condensate in the solid carbon dioxide-cooled trap was recycled to the phosgene inlet during the run, there being 191 grams of phosgene in the cold trap at the end of the run and some phosgene being lost to the water scrubber. The conversion of trichloroacetic acid to trichloroacetyl chloride was about 99.5 percent of theory.

We claim:

1. In the preparation of monocarboxylic acid chlorides by reaction of phosgene and a monocarboxylic acid in a liquid form, the improvement which comprises carrying out the reaction between the phosgene and the monocarboxylic acid in a reaction zone at a reaction temperature between room temperature and the boiling point of the reaction mixture, but not above about 200° C., while having the reactants in contact with from 0.5 to 10 percent of the total weight of the reaction mixture of a solid insoluble nitrogenous anion exchange resin which contains nitrogenous anion exchange groups in a salt form and is maintained in the reaction zone as catalyst for the reaction.

2. The improvement according to claim 1 wherein the insoluble nitrogenous anion exchange resin contains nitrogenous anion exchange groups in the chloride form.

3. The improvement according to claim 2 wherein the reaction temperature is maintained between 90° C. and the boiling point of the reaction mixture, but not above about 200° C.

4. The improvement according to claim 3 wherein the monocarboxylic acid is an aliphatic carboxylic acid.

5. The improvement according to claim 3 wherein the monocarboxylic acid is a halogenated aliphatic carboxylic acid.

6. The improvement according to claim 3 wherein the monocarboxylic acid is a chlorinated aliphatic carboxylic acid.

7. The improvement according to claim 3 wherein the monocarboxylic acid is a chlorinated acetic acid.

8. The improvement according to claim 3 wherein the anion exchange resin contains quaternary N-dimethyl-N-ethanol ammonium chloride groups attached to methyl substituents on the aromatic nuclei of a crosslinked styrene-divinylbenzene copolymer resin.

9. The improvement according to claim 3 wherein the reaction mixture comprising the starting phosgene and monocarboxylic acid in liquid form is passed through a permeable bed of granules of the solid insoluble nitrogenous anion exchange resin held in the reaction zone.

10. The improvement according to claim 9 wherein a liquid stream comprising the starting monocarboxylic acid is passed downward through a permeable bed of granules of the solid insoluble nitrogenous anion exchange resin held in the reaction zone and a gas stream comprising phosgene is passed upward through that permeable bed in intimate mixture with the liquid stream in the reaction zone.

11. The improvement according to claim 10 wherein the monocarboxylic acid is an aliphatic carboxylic acid.

12. The improvement according to claim 10, wherein the monocarboxylic acid is a chlorinated aliphatic carboxylic acid.

13. The improvement according to claim 10 wherein the monocarboxylic acid is a chlorinated aliphatic carboxylic acid.

14. The improvement according to claim 10 wherein the monocarboxylic acid is a chlorinated acetic acid.

15. The improvement according to claim 10 wherein the anion exchange resin contains quaternary N-dimethyl-N-ethanol ammonium chloride groups attached to methyl substituents on the aromatic nuclei of a crosslinked styrene-divinylbenzene copolymer resin.

16. The improvement according to claim 15 wherein the monocarboxylic acid is a chlorinated aliphatic carboxylic acid.

17. The improvement according to claim 15 wherein the monocarboxylic acid is a chlorinated acetic acid.

18. In the preparation of chloroacetyl chloride by reaction of phosgene and chloroacetic acid, the improvement which comprises maintaining in a reaction zone a permeable bed of granules of a solid insoluble anion exchange resin which contains quaternary N-dimethyl-N-ethanol ammonium chloride groups attached to methyl substituents on the aromatic nuclei of a crosslinked styrene-divinylbenzene copolymer resin, forming a reaction mixture in the reaction zone by passing downward through the permeable bed a liquid stream comprising chloroacetic acid and passing upward through the permeable bed a gaseous stream comprising phosgene and intimately mixing the liquid and gaseous streams, and maintaining the reaction mixture in the reaction zone at temperatures in the range from 90° C. to 120° C.

References Cited in the file of this patent

UNITED STATES PATENTS 2,126,180   Dyson et al. _____ Aug. 9, 1938

FOREIGN PATENTS 401,643   Great Britain _____ Feb. 12, 1932

OTHER REFERENCES

Anonymous: The Chemical Age, col. 2, p. 180, January 26, 1952.

Kressman: Research, col. 2, p, 217, May 1952.

Rohm & Haas Co., Ion Exchange Report: Wash. Sq. Phila., #4, 1953 (p. 4).

UNITED STATES PATENT OFFICE
CERTIFICATE OF CORRECTION

Patent No. 2,848,491                                  August 19, 1958

Gordon F. MacKenzie et al

It is hereby certified that error appears in the printed specification of the above numbered patent requiring correction and that the said Letters Patent should read as corrected below.

Column 7, line 32, for "chlorinated" read -- halogenated --.

Signed and sealed this 2nd day of June 1959.

(SEAL)
Attest:

KARL H. AXLINE
Attesting Officer

ROBERT C. WATSON
Commissioner of Patents